Aug. 11, 1953   P. R. FINCH   2,648,226
TEMPERATURE INDICATOR FOR NURSING BOTTLES
Filed Nov. 26, 1948
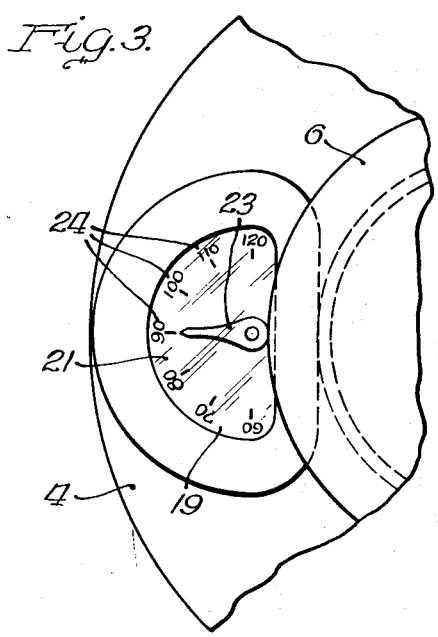
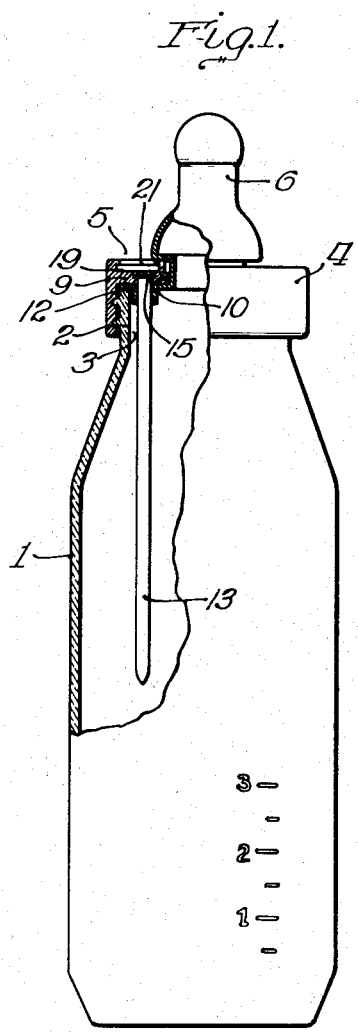
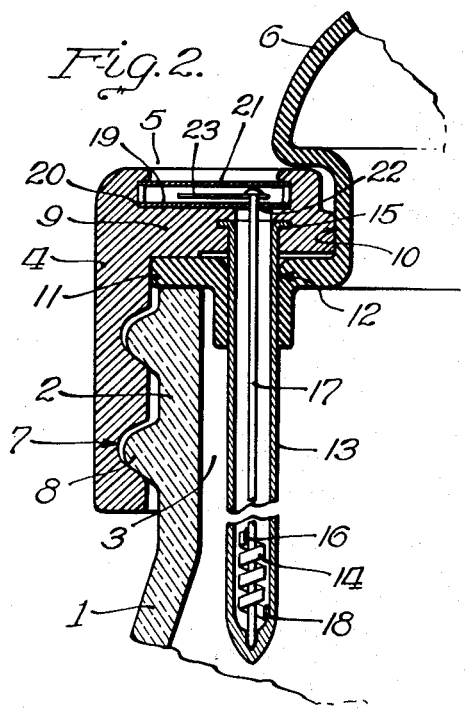
INVENTOR.
Percy R. Finch Patented Aug. 11, 1953

2,648,226

UNITED STATES PATENT OFFICE 2,648,226

TEMPERATURE INDICATOR FOR NURSING BOTTLES

Percy R. Finch, Chicago, Ill., assignor to Eric Glasser, Chicago, Ill.

Application November 26, 1948, Serial No. 62,069

4 Claims. (Cl. 73—343)

This invention relates to new and useful improvements in infants' nursing bottles, and has particular relation to a cap for such bottles with a nipple adapted to be removably mounted on the cap and temperature indicating means built in as a part of the cap.

Infants' nursing bottles embodying temperature indicating means for indicating the temperature of the contents of the bottle have been previously proposed. Such devices, however, have usually had the temperature indicating means on the outside of the bottle or within the thickness of the wall of the bottle. As a result, special construction of the bottle is usually required and the temperature indication is not always obtained in the desired manner.

One of the main objects of the present invention is to provide an improved form of device of the class described, which will always indicate the temperature of the contents of the bottle accurately, and wherein special construction of the bottle is avoided.

Another object of the invention is to provide a cap adapted for application to existing forms of infants' nursing bottles, with a nipple adapted to be removably mounted on the cap and temperature indicating means built in as a part of the cap and in such manner as not to interfere with proper positioning of the nipple or with removal of the nipple, for example, for sterilization purposes.

Another object of the invention is to provide a device of the character described, in which the temperature indicating means is in the form of an immersion type thermometer having a tube of stainless steel or like material for sanitation and sterilization enclosing a bimetal coil and carried by the cap to be positioned within the nursing bottle and in contact with the contents thereof, and to be withdrawn from the bottle by application and removal of the cap.

Another object of the invention is to provide an improved form of device having various features of novelty and advantages, and which is particularly characterized by its simplicity in construction, its economy in manufacture, and its effectiveness in use.

Further objects and advantages of the invention will appear from the following detailed description, taken in connection with the accompanying drawing, which illustrates the manner of constructing and using an illustrative embodiment of the invention.

In the drawing:

Figure 1 is a side elevational view partially in section showing one form of infants' nursing bottle provided with a cap having one form of nipple and temperature indicating means embodying the present invention;

Figure 2 is an enlarged fragmentary detail section through the temperature indicating means and the adjacent portions of the cap, bottle and nipple; and Figure 3 is a fragmentary top plan view showing the temperature indicating dial and pointer.

Referring now to the drawing, the numeral 1 denotes a nursing bottle formed of glass or other suitable material and provided with a neck 2 defining the mouth 3 of the bottle.

The bottle 1 may be of any existing or other suitable form, and it is a feature of this invention to provide a clamping ring 4 adapted for application to existing forms of infants' nursing bottles and having temperature indicating means 5 built in as a part of the cap, and a nipple 6 removable from both the cap and the temperature measuring means, for example, for sterilization. The ring 4 is shown with an integral annular flange provided with internal thread means 7 for screw-on engagement with cooperating external thread means 8 on the neck of the bottle. It is to be understood, however, that the ring 4, instead of being of the screw-on type as shown in the drawing, may be of the slip-on or of any other desired type.

The ring 4, which may be molded of plastic material, such as Bakelite, or formed of stainless steel or other suitable material, has an integral outer wall 9 provided with an opening 10 at the axis of the ring. The nipple 6 is formed of rubber or other suitable material, and is removably mounted on ring 4, with the interior of the nipple in communication with the interior of the bottle through the opening 10. The nipple 6 has at its inner end an integral radially extending flange 11 positioned to be interposed between the cap and the bottle to seal the joint therebetween when the ring is applied to the bottle. The radially extending flange 11 has an opening 12 eccentric with respect to the axis of the ring 4 and out of register with the opening 10.

The temperature indicating means is shown in the form of an immersion thermometer comprising a tube 13 formed of material of the character of stainless steel. The tube 13 encloses a bimetal coil 14 and has its outer end built or molded in at 15 as a part of the ring 4 and sealed against entry of the contents of the bottle into the tube 13 where such contents might deleteriously affect the coil 14. The tube 13 projects through the opening 12 for removal of the nipple 6 from both the ring 4 and the thermometer, for example, for sterilization. The upper end of the coil 14 is anchored at 16 to a shaft or rod 17, and the lower end of the coil 14 is anchored at 18 to the interior of the sealed tube 13, whereby the shaft or rod 17 turns with changes in temperature of the infants' milk, liquid feeding formula or the like with which the tube has direct contact when the ring 4 is applied to the bottle.

For the purpose of indicating at all times the temperature of the contents of the bottle, the device has a dial 19 built or molded in at 20 as a part of the ring 4 and visible from outside the ring, for example, through a glass or other transparent window 21. The window 21 may be built or molded in as a part of the ring 4, or it may be removable. The outer end of the shaft or rod 17 projects through an opening 22 in the dial 19, and carries a pointer 23 which moves over the dial 19 and, by the temperature markings 24 on the outer surface of the dial, indicates the temperature of the contents of the bottle.

In use, the temperature indicating means makes it possible accurately to maintain liquid infants' foods within the bottle at the desired feeding temperature (usually 98.6° F.) at all times; and feeding of the infant with liquid food which is either too cold or too hot is avoided. The tissues of the mouth, throat and stomach of an infant are tender, and colic and various stomach disorders have been the result of feeding with liquids which are too hot or too cold. Guesswork, in ascertaining the temperature of the liquid, for example, by squirting some of the liquid on the arm or wrist before feeding it to the infant is also avoided.

The embodiment of the invention shown in the drawing is for illustrative purposes only, and it is to be expressly understood that said drawing and the accompanying specification are not to be construed as a definition of the limits or scope of the invention, reference being had to the appended claims for that purpose.

I claim:

1. In a nursing bottle having an opening in the top, the combination comprising a nipple having a flange circumferentially thereof resting on the top of said bottle and circumscribing said opening, a clamping ring threaded on said bottle, said ring having an annular flange resting on the flange of said nipple, there being an aperture through the flange of said nipple, and the flange of said ring having a thermometer mounted thereon with its temperature sensitive element extending through said aperture and into said bottle.

2. The combination with a nursing bottle according to claim 1, wherein the thermometer has temperature indicating means mounted in the clamping ring and visible through an outwardly directed opening in said ring.

3. The combination with a nursing bottle according to claim 1, wherein the thermometer comprises a tube closed at its inner end and having an open outer end secured to the clamping ring and a bimetal coil enclosed within said tube and connected at its outer end to temperature indicating means mounted in said clamping ring and visible through an upwardly directed opening in said ring.

4. For use with a nursing bottle having an opening in the top and a nipple having a flange circumferentially thereof for resting on the top of the bottle and circumscribing the opening, and wherein there is an aperture through the flange of the nipple; a clamping ring having means for attaching it to the bottle, said ring having an annular flange for resting on the flange of the nipple; the flange of said ring having a thermometer mounted thereon with its temperature sensitive element arranged to extend through the aperture through the flange of the nipple and into the bottle when said ring is attached to the bottle.

PERCY R. FINCH.

References Cited in the file of this patent

UNITED STATES PATENTS

| Number | Name | Date |
|---|---|---|
| 1,828,628 | Torgerson | Oct. 20, 1931 |
| 2,093,730 | Kurkjian | Sept. 21, 1937 |
| 2,179,158 | Marks | Nov. 7, 1939 |

FOREIGN PATENTS

| Number | Country | Date |
|---|---|---|
| 29,516 | France | Aug. 22, 1925 |